(12) United States Patent
Paulitsch et al.

(10) Patent No.: US 10,048,156 B2
(45) Date of Patent: Aug. 14, 2018

(54) PRESSURE TRANSDUCER AND METHOD FOR OPERATING THE PRESSURE TRANSDUCER

(71) Applicant: Siemens Aktiengesellschaft, Munich (DE)

(72) Inventors: Christoph Paulitsch, Karlsruhe (DE); Stefan Von Dosky, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 200 days.

(21) Appl. No.: 15/113,805

(22) PCT Filed: Jun. 30, 2014

(86) PCT No.: PCT/EP2014/063791
§ 371 (c)(1),
(2) Date: Jul. 22, 2016

(87) PCT Pub. No.: WO2015/113654
PCT Pub. Date: Aug. 6, 2015

(65) Prior Publication Data
US 2016/0341623 A1    Nov. 24, 2016

(30) Foreign Application Priority Data

Jan. 28, 2014  (DE) .................. 10 2014 201 529

(51) Int. Cl.
*G01L 9/12*  (2006.01)
*G01L 19/06*  (2006.01)
(Continued)

(52) U.S. Cl.
CPC .......... *G01L 27/007* (2013.01); *G01L 9/0072* (2013.01); *G01M 3/40* (2013.01)

(58) Field of Classification Search
CPC . G01L 9/00; G01L 9/0072; G01L 9/12; G01L 19/06; G01L 19/12; G01L 27/00; G01L 27/007; G01M 3/40
See application file for complete search history.

(56) References Cited

U.S. PATENT DOCUMENTS 4,682,502 A  7/1987  Miyoshi et al.
5,641,911 A  6/1997  Ryhänen
(Continued)

FOREIGN PATENT DOCUMENTS

CN  1334451  2/2002
CN  1508525  6/2004
(Continued)

OTHER PUBLICATIONS

Office Action dated Jul. 19, 2017 which issued in the corresponding Chinese Patent Application No. 201480068654.6.

*Primary Examiner* — Nguyen Ha
(74) *Attorney, Agent, or Firm* — Cozen O'Connor

(57) ABSTRACT

A method for operating a pressure transducer which transducer includes a pressure sensor having a measurement membrane and a base body, between which a cavity is enclosed with a reference pressure, wherein utilizing a control and calculation unit in a pressure measuring mode, the capacitance of a measuring capacitor and a reference capacitor are determined, and a measured value of the media pressure is calculated as a function thereof, where during a diagnostics mode, the capacitance is determined and evaluated for a diagnostics capacitor formed by one measuring capacitor electrode and one reference capacitor electrode arranged on the same surface such that changes in the relative humidity in the cavity and/or process medium penetrating through a tear can be detected with via the diagnostic capacitor, and a warning signal regarding an (Continued)

impending malfunction can thus be generated and output to a service device in a timely manner.

13 Claims, 3 Drawing Sheets

(51) Int. Cl.
 *G01L 19/12* (2006.01)
 *G01L 27/00* (2006.01)
 *G01M 3/40* (2006.01)
 *G01L 9/00* (2006.01)

(56) References Cited

U.S. PATENT DOCUMENTS

| | | | |
|---|---|---|---|
| 7,026,645 | B2 | 4/2006 | Christenson et al. |
| 8,258,450 | B1 | 9/2012 | Fries |
| 2004/0129085 | A1 | 7/2004 | Mundry et al. |
| 2007/0169557 | A1* | 7/2007 | Harasyn .................. G01L 9/12 73/718 |
| 2011/0239773 | A1* | 10/2011 | Klosinski .............. G01L 9/0016 73/724 |
| 2013/0118265 | A1 | 5/2013 | Besling et al. |
| 2013/0269412 | A1 | 10/2013 | Walter |
| 2014/0144206 | A1 | 5/2014 | Uehlin et al. |

FOREIGN PATENT DOCUMENTS

| | | |
|---|---|---|
| CN | 1672023 | 9/2005 |
| CN | 102768093 | 11/2012 |
| CN | 102928133 | 2/2013 |
| DE | 3529799 C2 | 8/1987 |
| DE | 69419100 T2 | 3/2000 |
| DE | 10235046 A1 | 2/2004 |
| DE | 102009002662 A1 | 10/2010 |
| DE | 102010062622 A1 | 6/2012 |
| KR | 20060094326 | 8/2006 |
| WO | WO 2013004438 A1 | 1/2013 |

* cited by examiner

PRESSURE TRANSDUCER AND METHOD FOR OPERATING THE PRESSURE TRANSDUCER

CROSS-REFERENCE TO RELATED APPLICATIONS

This is a U.S. national stage of application No. PCT/EP2014/063791 filed 30 Jun. 2014. Priority is claimed on German Application No. 10 2014 201 529.4 filed 28 Jan. 2014, the content of which is incorporated herein by reference in its entirety.

BACKGROUND OF THE INVENTION

1. Field of the Invention

The invention relates to a method for operating a pressure transducer comprising a pressure sensor, which has a measurement membrane that deflects depending on media pressure, on a base body, between which a cavity is enclosed with a reference pressure, and to a pressure transducer for process instrumentation.

2. Description of the Related Art

In industrial process control systems, a wide range of field devices for process instrumentation is employed to control processes. Measuring transducers are used to capture process variables, such as temperature, pressure, flow rate, fill level, density or gas concentration of a medium. The process sequence can be influenced by final control elements depending on captured process variables in accordance with a strategy predetermined, for example, by a control station. The invention relates, in particular, in the pressure measuring technology sector to field devices having a measuring cell which can be assigned to the class of "dry" pressure measuring cells. With this type of pressure measuring cells, no oil filling is present that transmits the pressure of a process medium to a small and sensitive pressure sensor that, for example, has a silicon membrane. In dry pressure measuring cells on the other hand, the pressure sensor has a membrane in contact with the medium which can be deflected depending on a media pressure to be measured.

WO 2013/004438 A1 discloses a dry pressure measuring cell employing capacitive capture of the deflection of the measurement membrane. The heart of the measuring cell is formed by a ceramic pressure sensor that has a flexible measurement membrane and a base body, between which a cavity is enclosed with a reference pressure. The deflection of the measurement membrane is thus dependent on a media pressure, which is present on the media side at the measurement membrane, and on the reference pressure in the cavity. Two capacitors are used to capacitively capture the deflection of the measurement membrane, where a first capacitor has (as a measuring capacitor) a measuring electrode that is arranged on the inner wall of the cavity in the central region of the base body, and where a second capacitor has (as a reference capacitor) a reference electrode which is situated in the edge region of the base body on the inner wall of the cavity. A metallization that is applied on the side of the measurement membrane that faces the cavity forms a common counter electrode for the two capacitors. It is described that in the fault-free case the capacitance of the reference capacitor is dependent on the capacitance of the measuring capacitor in accordance with an empirically learned function. For the purpose of fault diagnosis, monitoring is performed during operation of the pressure transducer to determine whether value pairs of the capacitance of the reference capacitor and the capacitance of the measuring capacitor conform to the learned functional relationship within a predefined tolerance range. If this is not the case, this is an indication of damage to the measuring cell. Damage can thereby primarily be recognized, which results in a change in the flexural line of the measurement membrane. Possible causes mentioned are a malfunction of the fixed connection at the joint between measurement membrane and base body or radial compressive offset stresses or yield stresses introduced into the measurement membrane by way of the mounting of the pressure sensor. Changes in the composition of the medium situated in the cavity can however not be reliably recognized.

Under harsh process conditions, such as those existing in the paper industry, or in the case of sudden temperature changes due to cleaning or sterilization in the food industry, tears or breaks may occur that particularly affect the membrane, as a result of which process medium penetrates into the cavity of the ceramic pressure sensor. This can lead to a malfunction of the pressure transducer. The fact that a pressure transducer has failed on account of penetrating process medium can, for example, be recognized as a result of detecting a short-circuit between capacitor electrodes of the pressure sensor. It is, however, desirable that an impending malfunction is recognized as early as possible in advance so that maintenance personnel are able to plan appropriate measures in advance, such as the timely replacement of the pressure transducer, and execute the measures at a suitable point in time such that unforeseen downtime of an industrial process control system in which the pressure transducer is employed can be avoided.

SUMMARY OF THE INVENTION

It is an object of the invention is to provide a pressure transducer and method for operating the pressure transducer and a pressure transducer which make it possible to recognize changes in the filling of the cavity of a pressure sensor at an early stage, in particular as a result of penetrating process medium, i.e., before a malfunction of the pressure transducer has occurred.

This and other objects and advantages are achieved in accordance with the invention by a method, a pressure transducer for implementing the method, a computer program and a computer program product in which for diagnostic purposes the capacitance of a diagnostics capacitor that is formed by the electrodes of the measuring capacitor and of the reference capacitor arranged on the same surface is evaluated. The new diagnosis based on the evaluation of the capacitance of the diagnostics capacitor can be performed as an alternative to a diagnosis based on an evaluation of the capacitances of measuring capacitor and/or reference capacitor or in combination with the latter. It is of considerable advantage in this situation that the capacitance of the diagnostics capacitor is largely independent of the media pressure present at the pressure transducer and of the flexural line occurring in the measurement membrane. At least one part of the electrical field between the two electrodes of the diagnostics capacitor encompasses the cavity of the pressure sensor. As a result, the capacitance of the diagnostics capacitor is influenced to a considerable degree by the dielectric conductivity of the materials located in the cavity. Based on the evaluation of the capacitance of the diagnostics capacitor, the new diagnosis of the pressure transducer therefore provides reliable information about the status of the filling of the cavity, in particular about changes in the relative humidity prevailing in the cavity and/or about the process medium penetrating into the cavity, as a result of which the dielectric conductivity of the filling is changed. If changes are found, this is indicative of the presence of a fault, in particular a tear or break in the measurement membrane or a tear at the joint between the measurement membrane and base body. In addition, based on the time gradient of the change a prognosis can be made as to when a total malfunction of the pressure transducer can be expected.

An exact determination of the current capacitance of the diagnostics capacitor is made possible, for example, when using the conventional type AD7746 capacitance-to-digital converter (CDC) from Analog Devices through a switchover to a diagnostics mode in which the two electrodes of the diagnostics capacitor are connected to the EXT or CIN2 terminals and the common counter electrode is connected to the GND terminal. This means that the capacitances between the electrodes of the diagnostics capacitor and the counter electrode, which correspond to the measuring capacitor and the reference capacitor, are handled and compensated for as shielding capacitances during the measurement of the capacitance of the diagnostics capacitor in the diagnostics mode. This also has the advantage that no additional electrodes are required to implement the diagnostics capacitor. The invention is therefore advantageously not associated with an increase in the hardware requirement for the pressure transducer. By means of additional switching of measuring range in the capacitance-to-digital converter, it is possible to precisely measure the comparatively small capacitance of the diagnostics capacitor. In a pressure measuring mode or during the measurement of the capacitance of the measuring and reference capacitor for supplementary types of diagnosis of the pressure transducer not considered in the present application, the capacitance-to-digital converter can be connected in a known manner. In the pressure measuring mode, the capacitance of the diagnostics capacitor can be regarded as a parasitic capacitance or stray capacitance, which on account of its comparatively small magnitude, has hardly any influence on the measurement result.

Material tearing occurs in the first instance in areas of high mechanical stresses that are located predominantly in the edge region of the measurement membrane and also in the joint between measurement membrane and base body, which is also referred to as glass frit on account of the frequent use of a glass solder. A penetration of process medium therefore initially results in a change in the capacitance of the diagnostics capacitor before the pressure measurement result, which is determined predominantly by the capacitance of the measuring capacitor, is falsified to a considerable degree. In order to compensate for the influence of a slowly changing permittivity of the mixture contained in the cavity on the pressure measurement result, the cyclically determined capacitance of the diagnostics capacitor, for example, can advantageously be taken into consideration in the calculation of a measurement value for the media pressure to be measured. A corrected substitute value is thereby obtained, which means that an emergency operation of the pressure transducer is possible.

In addition to the aforementioned wear of the glass frit caused by microfissures or to the breakage of the separating membrane, a further malfunction phenomenon may occur in particular in the case of dry pressure measuring cells for relative pressure. In the case of pressure sensors for relative pressure, due to its construction the cavity is connected to the ambient air. This means that ambient air is also able to pass between the capacitor electrodes. A long thin tube that is coupled to the ambient environment by way of a sinter filter is often used as the rear-side connection for relative pressure sensors. The stationary air in the tube has a high diffusion resistance for water molecules. Changes in the humidity in the ambient environment result in delayed corresponding changes in the cavity of the pressure sensor and may, if this effect is not compensated for, result in changes to the measurement values calculated based on the capacitances of the measuring capacitor and reference capacitor for the pressure to be measured. On account of the comparatively high dielectric polarity of water vapor, a slight increase in the humidity of 5%, for example, already leads to a drift of the measurement value for the pressure of 3%.

During cleaning work in process systems the ambient humidity can change rapidly which can in turn, without suitable corrective action, result in major errors in the pressure measurement. On account of the comparatively small cavity in the pressure sensor such changes take place only slowly. In addition, irreversibilities may occur that are caused by an adhesion or retention of water molecules at acute-angled edges in the cavity. The responsiveness and sensitivity of the diagnostics capacitor with respect to the relative humidity in the cavity can therefore advantageously be increased via a polymer dielectric, in particular by a Kapton film, which is arranged between the electrodes of the diagnostics capacitor. This additional dielectric is therefore arranged such that at least one part of the electrical field of the diagnostics capacitor will lie therein. A Kapton film has the advantage in this situation that it has a low-hysteresis characteristic curve of its dielectric conductivity from the relative humidity.

In a particularly advantageous embodiment, the determined capacitance of the diagnostics capacitor is compared with a first predetermined threshold value and in the event of the first threshold value being exceeded a warning signal is generated and output by the pressure transducer, where the warning signal serves to indicate the existence of a critical state of the pressure sensor as a precursor of a malfunction possibly following later. This advantageously enables a predictive detection of faults and a warning is generated before a malfunction occurs which, when the pressure transducer is employed in an industrial process control system, would possibly be associated with undesired system downtime.

In a further advantageous embodiment, the capacitance of the diagnostics capacitor can additionally be compared with a second predetermined threshold value, where in the event of the second threshold value also being exceeded an alarm signal is generated and output, where the alarm signal serves to indicate a malfunction occurring in the foreseeable future. This has the advantage that a reliable indication is given of an impending malfunction. Maintenance work can thus be initiated in a timely manner ahead of a costly system shutdown.

The diagnosis can advantageously be developed such that, depending on the capacitance of the diagnostics capacitor in the go state which, for example, is determined during commissioning or is predefined as a parameter, an estimated value for a period of time until the occurrence of the impending malfunction is determined and output depending on a predefined dielectric conductivity of a medium penetrating into the cavity, on the two threshold values, and on the interval between the points in time when they are exceeded. Based on the estimated value, it is namely advantageously possible to assess whether a repair is already required in the next maintenance cycle. Maintenance measures can thereby be better planned.

The warning signal indicating possibly required maintenance measures is preferably output directly on a service device so that a service engineer receives appropriate instructions for performing the maintenance work actually on site.

The method is preferably implemented in the form of software or as a combination of software and hardware, so that the invention also relates to a computer program containing program code instructions which can be executed by a computer to implement the method outlined above and described in the following. In this context the invention also relates to a computer program product, in particular a data medium or a storage medium, containing such a type of computer program which can be executed by a computer. Such a computer program is preferably part of a control and calculation electronics unit of the pressure transducer or is stored in a memory of the electronics or can be loaded into the memory, such that the diagnosis of the pressure transducer during operation thereof is carried out automatically according to the method.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTIONS OF THE DRAWINGS

The invention as well as embodiments and advantages will be described in detail in the following with reference to the drawings in which an exemplary embodiment of the invention is illustrated, in which.

DETAILED DESCRIPTION OF THE EXEMPLARY EMBODIMENTS

Figure 1:
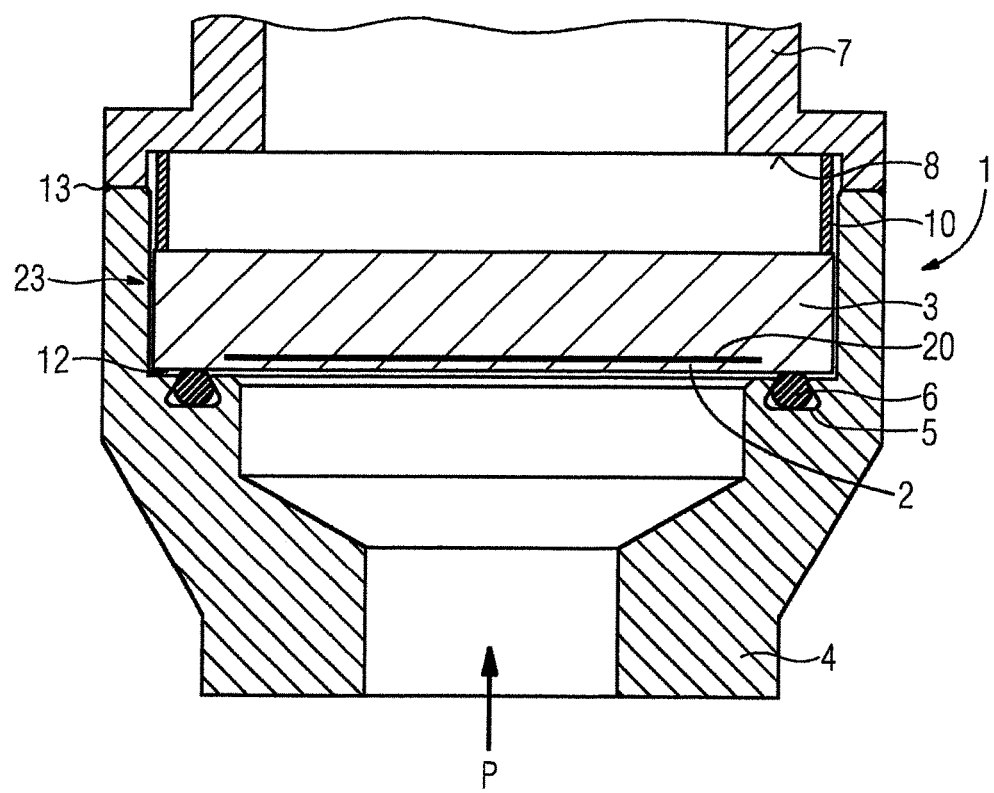
FIG. 1 shows a sectional view of the part of a pressure transducer which is frequently referred to as the measuring cell.

The same parts are identified by the same reference characters in both the figures.

The central component of the essentially rotationally symmetric measuring cell 1 is a disk-shaped pressure sensor 23 that comprises a sensor membrane 2 and a base body 3. A cavity 20 is enclosed between the sensor membrane 2 and the base body 3, the structure of which cavity 20 will be described in detail below with reference to FIG. 2. A reference pressure prevails in the cavity 20 which, in the case of an absolute pressure transducer, for example, corresponds to a vacuum, in the case of a pressure transducer for relative pressure, for example, corresponds to the ambient pressure. The actual deflection of the measurement membrane 2, which is dependent on the applied pressure P and the reference pressure prevailing in the cavity 20, is captured capacitively by the pressure sensor 23. In order to transmit the pressure P of a process medium to the measurement membrane 2, a process connection 4 is used which, in the exemplary embodiment shown simultaneously, forms a first housing part of the pressure transducer and in a groove 5 carries an elastic sealing ring 6 which here is formed as an O-ring. A second housing part 7, which in the upward direction can become a housing (not illustrated in more detail) of a control and calculation electronics unit, with a stop surface 8 forms a rear-side support ring for the pressure sensor 23. For a floating mounting of the pressure sensor 23, a hollow cylinder shaped spacer ring 10, which is capable of deflection in the radial direction and thereby reduces the occurrence of radial stresses in the pressure sensor 23 in the event of temperature fluctuations, is inserted between the rear-side support ring 7 and the rear side of the pressure sensor 23.

In order to mount the measuring cell 1, the sealing ring 6 is firstly inserted into the groove and is reliably secured there on account of the swallow-tailed shape of the groove preventing it from falling out. The pressure sensor 23 and the spacer ring 10 are now inserted. In order to generate the axial clamping force required for mounting the pressure sensor 23, the second housing part 7, which at the same time constitutes the rear-side support ring, is then fitted and pressed against the first housing part 4. In this situation, the sealing ring 6 is pressed together such that a gap 12 remains between the surface of the first housing part 4 surrounding the sealing ring 6 and the side of the pressure sensor 23 facing the process medium. The two housing parts 4 and 7 pressed together, which are rotationally symmetric, are rotated about their common axis and welded together at their circular joint via a radial weld 13.

Normal pressure sensors 3 have a diameter of approx. 32 mm. The thickness of the measurement membrane 2 lies between approx. 0.5 mm and approx. 2 mm, depending on the pressure measurement range. The cavity 20 has a height of approx. 0.03 mm. In an overload situation, the measurement membrane 2 is deformed in the central region by this amount and contacts the base body 3. In the event of shock, pressure loading irreversible overloads or damage may occur in the region of high material stress, in particular in the region of the joint between measurement membrane 2 and base body 3. If process medium gets past the sealing ring 6 on account of diffusion or leaks and reaches the circumferential region of the pressure sensor 23, the process medium can also enter the cavity 20 and thereby falsify the measurement result of the pressure transducer, if for example damage in the form of a crack in the glass frit has occurred.

Figure 2:
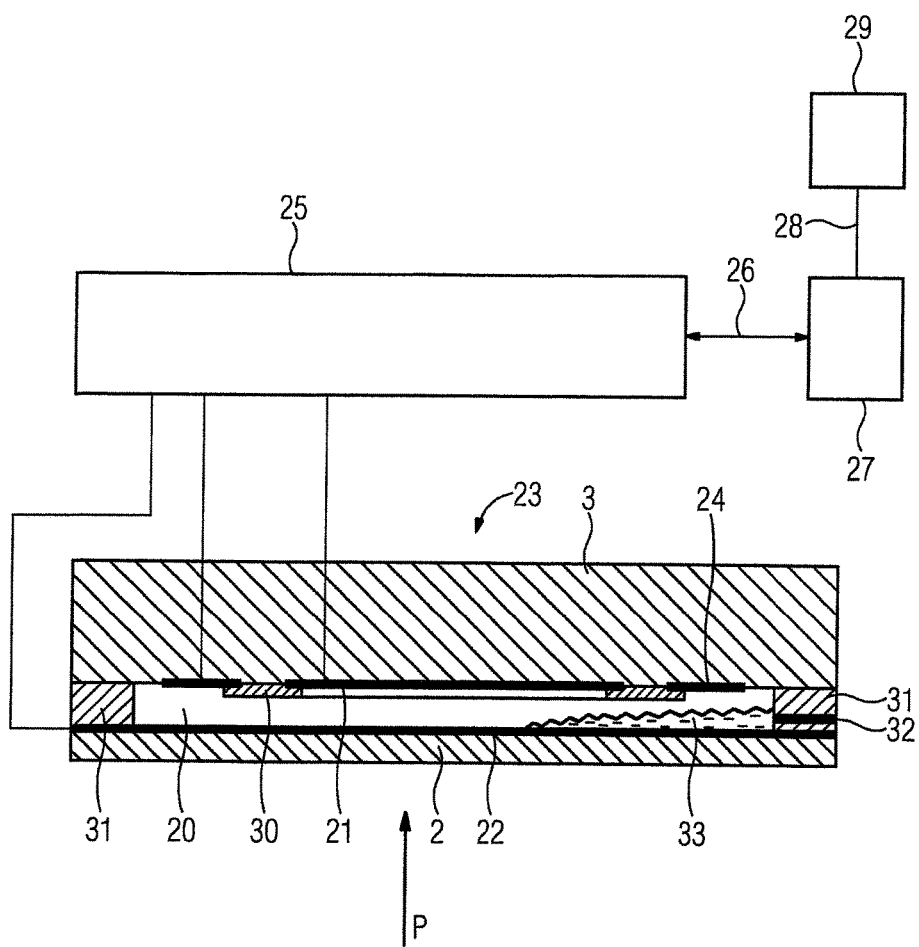
FIG. 2 shows a block diagram of a pressure transducer with a schematic diagram of the pressure sensor.

With reference to FIG. 2, which demonstrates in a not-to-scale illustration, the structural principle of the pressure sensor 23, the method for operating the pressure transducer and the pressure transducer itself will be explained in detail in the following. A first capacitor, which is referred to in the present application as a measuring capacitor, is formed by a first electrode 21, also referred to as a measuring electrode, and a counter electrode 22. A second capacitor, referred to as a reference capacitor, has an electrode 24 arranged essentially in circular manner in the edge region, also referred to as a reference electrode, and the same counter electrode 22. The counter electrode 22 common to both capacitors is formed by a metallization on the side of the measurement membrane 2 facing the cavity 20. In an alternative embodiment, not illustrated, instead of the common counter electrode 22 it is naturally also possible to provide separate counter electrodes for each capacitor on the measurement membrane 2.

In a pressure measuring mode, the respective capacitances of the measuring capacitor and the reference capacitor are captured and converted by a control and calculation unit 25 into a measurement value for the pressure P that is transferred via an interface 26 to a superordinate controller 27 in an industrial process control system that is not illustrated in more detail. For the purpose of an on-site display, the measurement value for the pressure can moreover be output via an interface 28, such as a W-LAN, to a service device 29 to enable a service team member to read off the pressure value directly at the field device in the plant without the field device itself needing to be provided with a display panel.

The control and calculation unit 25 switches at cyclically recurring time intervals into a diagnostics mode in which the connection of a type AD7746 CDC from Analog Devices is changed such that the capacitance of a diagnostics capacitor, which is formed by the measuring electrode 21 and the reference electrode 24 that are situated on the same surface at the inner wall of the cavity 20, is captured and evaluated for diagnosis of the pressure transducer. With regard to the measurement of the comparatively small capacitance of the diagnostics capacitor, which is of the order of magnitude of one picofarad, the capacitances of the measuring capacitor and of the reference capacitor, which are greater by a factor of 100, are compensated for as shielding capacitances by the CDC. In the diagnostics mode, even fairly small changes in the permittivity of the mixture of substances contained in the cavity 20, in the case of relative pressure sensors, for example, on account of a change in the relative humidity, can be captured and their influence on the measurement of the pressure P compensated for. This can take place, for example, based on the previously empirically determined characteristic curves that describe the dependencies of the capacitances of measuring capacitor and reference capacitor on the relative humidity prevailing in the cavity 20. For checking purposes, the value of the relative humidity determined in the cavity 20 can moreover be output on the display of the service device 29 so that a service engineer is able to compare the value with a value for the relative humidity which he has captured via a separate sensor in the ambient environment.

In order to increase the sensitivity of the diagnostic capacitance, a circular ring-shaped polymer dielectric 30 is arranged in the cavity 20 and partially covers the measuring electrode 21 arranged in the central region and the ring-shaped reference electrode 24 arranged in the edge region. Advantageously suited as a polymer dielectric 30 is a Kapton film, the characteristic curve whereof, which describes the dependence of the dielectric conductivity on the relative humidity, is characterized by a particularly low hysteresis.

Departing from the illustrated exemplary embodiment, the polymer dielectric may be arranged between or beneath the two electrodes. To facilitate assembly, it is also advantageous to retrospectively introduce the polymer dielectric through an opening in the base body into a recess in the base body provided for accommodating the polymer dielectric, in which case the introduction advantageously occurs only after the base body has already been connected with the measurement membrane by using high temperature to fuse the glass frit.

Regions of the pressure sensor 23 that are subjected to particularly high mechanical stresses with pressure P present at the measurement membrane 2 are the edge region of the measurement membrane 2 and a glass frit 31 situated at the joint of measurement membrane 2 and base body 3. Glass solders which are normally used to produce the glass frit 31 have a tendency toward crack formation when under thermal and/or mechanical stress. For example, process medium 33 that has previously passed through a leak in the seal 6 (FIG. 1) can penetrate through a tear 32 into the cavity 20 and there, for example, moisten part of the counter electrode 22. The dielectric conductivity of the penetrating medium 33 is for the most part higher than that of the filling present in the fault-free state in the cavity 20. For example, water has a relative permittivity of 80 and oil a relative permittivity between 2 and 5. If only a small quantity of process medium 33 has penetrated, the pressure transducer remains functional. For the predictive detection of faults that are heralded by a slowly increasing permittivity of the filling in the cavity 20, the determined capacitance of the diagnostics capacitor is compared with a first threshold value, preferably predetermined depending on the process medium in question. In the event of the first threshold value being exceeded, a warning signal is generated by the control and calculation unit 25 and output over the interface 26 as a warning message to the superordinate controller 27, by which warning signal the existence of a critical state of the pressure sensor 23 is indicated as a precursor of a possibly following malfunction. The warning message can additionally be displayed on a service device 29 to inform a service engineer about the critical status of the pressure transducer before the latter fails. During the further operation of the pressure transducer the output value for the existing pressure P is corrected accordingly by the control and calculation unit 25 to compensate for the influence of a changing permittivity of the mixture of substances contained in the cavity 20. In addition, the capacitance of the diagnostics capacitor is also compared with a second threshold value, preferably predetermined depending on the process medium in question, where in the event of the second threshold value being exceeded an impending malfunction is indicated by means of an alarm signal. For example, as a result of the alarm signal being output on the service device 29 timely maintenance work can be initiated before a costly system shutdown occurs. The second threshold value is preferably chosen such that, for example, with the size of the tear 32 remaining constant at least a restricted functionality of the pressure transducer can still be maintained for a foreseeable period of time.

Depending on the dielectric conductivity of the penetrating process medium 33, it is possible to estimate the point in time at which the progressive filling of the cavity 20 with process medium 33 does not permit any further measurement of the pressure P. The estimated value for the period of time remaining until the expected occurrence of the functional failure can be determined and output depending on a predefined value for the capacitance of the diagnostics capacitor in the go state, on the known dielectric conductivity of the process medium 33 penetrating into the cavity 20, on two predefined threshold values, and on the interval between the points in time when they are exceeded. Through a knowledge of the operating time remaining available for the pressure transducer, it is, for example, possible to decide whether the pressure transducer already needs to be replaced during the next maintenance cycle or not until the next but one maintenance cycle. Maintenance measures can thereby be better planned. If the warning signal indicating maintenance measures that may be required is output on the service device 29, a service engineer can advantageously receive on-site the information required for planning his maintenance measures.

Figure 3:
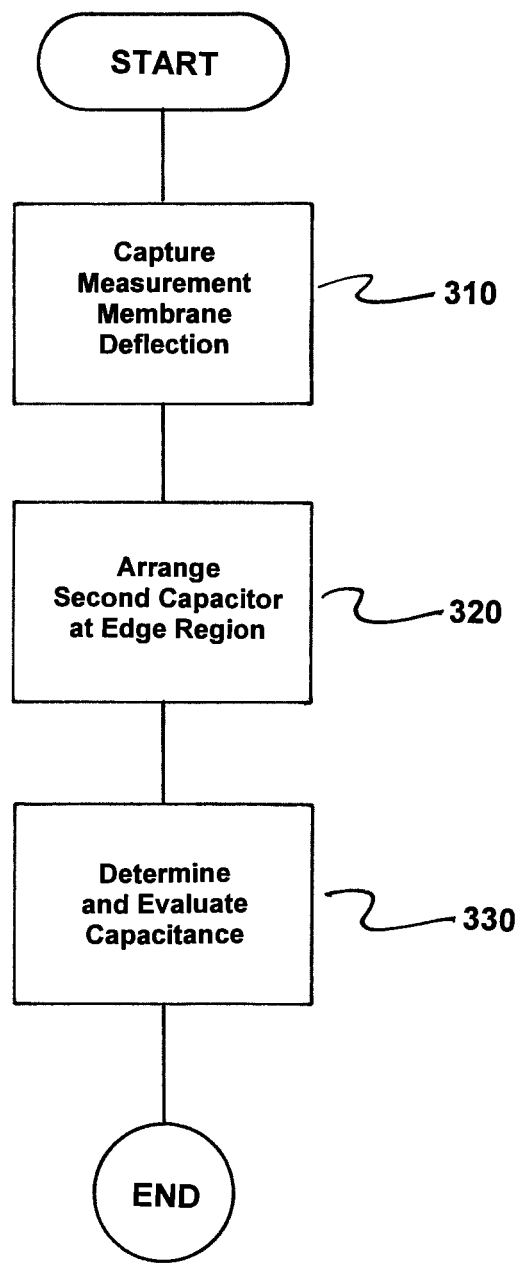
FIG. 3 is a flowchart of the method in accordance with the invention.

FIG. 3 is a flowchart of a method for operating a pressure transducer comprising a pressure sensor (23) having a flexible measurement membrane (2) and a base body (3), between which a cavity (20) is enclosed with a reference pressure, where a deflection of the measurement membrane (2) is dependent on the media pressure (P) present on a media side at the measurement membrane (2), and dependent on the reference pressure. The method comprises capturing a deflection of the measurement membrane (2) by at least one first capacitor having a plurality of electrodes (21, 22) and arranged in a central region of one of (i) the measurement membrane (2) and (ii) the base body (3) with a variable electrode spacing depending on the deflection, as indicated in step 310.

Next, at least one second capacitor having a plurality of electrodes (22, 24) is arranged at an edge region of one of (i) the measurement membrane (2) and (ii) the base body (3), as indicated in step 320.

Next, the capacitance of a diagnostics capacitor, which is formed by one electrode (21) of the at least one first capacitor and one electrode (24) of the at least one second capacitor and is arranged on a same surface is now determined and evaluated to diagnose the pressure transducer, as indicated in step 330.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating a pressure transducer comprising a pressure sensor having a flexible measurement membrane and a base body, between which a cavity is enclosed with a reference pressure, a deflection of the measurement membrane being dependent on a media pressure which is present on a media side at the measurement membrane, and dependent on the reference pressure, the method comprising:
    capturing a deflection of the measurement membrane by at least one first capacitor having a plurality of electrodes arranged in a central region of one of (i) the measurement membrane and (ii) the base body with a variable electrode spacing depending on the deflection;
    arranging at least one second capacitor having a plurality of electrodes at an edge region of one of (i) the measurement membrane and (ii) the base body; and
    determining and evaluating a capacitance of a diagnostics capacitor, which is formed by one electrode of the at least one first capacitor and one electrode of the at least one second capacitor, the electrodes being arranged on a same surface to diagnose the pressure transducer.

2. The method as claimed in claim 1, wherein the determined capacitance of the diagnostics capacitor is utilized during calculation of a measurement value for the media pressure to compensate for an influence of a permittivity of the medium contained in the cavity.

3. The method as claimed in claim 2, wherein a polymer dielectric is arranged between the electrodes of the diagnostics capacitor to increase sensitivity to humidity.

4. The method as claimed in claim 1, wherein the determined capacitance of the diagnostics capacitor is compared with a first predetermined threshold value; and wherein a warning signal is generated and output in an event of the first predetermined threshold value being exceeded, said warning signal indicating an existence of a critical state of the pressure sensor as a precursor of a potential malfunction occurring subsequently.

5. The method as claimed in claim 4, wherein the capacitance of the diagnostics capacitor is furthermore compared with a second predetermined threshold value in an event of the first predetermined threshold value being exceeded; and wherein an alarm signal is generated and output in the event of the second predetermined threshold value also being exceeded, said alarm signal indicating an impending malfunction.

6. The method as claimed in claim 5, wherein an estimated value for a period of time until the occurrence of the malfunction is determined and output depending on (i) a predefined value of the capacitance of the diagnostics capacitor in a go state, (ii) a predefined dielectric conductivity of a medium penetrating into the cavity, (iii) on the first and second predetermined threshold values, and (iv) an interval between points in time when the first and second predetermined threshold values are exceeded.

7. The method as claimed in claim 4, wherein the warning signal indicating possibly required maintenance measures is output on a service device.

8. The method as claimed in claim 5, wherein the warning signal indicating possibly required maintenance measures is output on a service device.

9. The method as claimed in claim 6, wherein the warning signal indicating possibly required maintenance measures is output on a service device.

10. A computer program containing program code instructions executed by a computer to implement the method as claimed in claim 1 when the computer program is executed on a computer.

11. A pressure transducer comprising:
    a pressure sensor having a flexible measurement membrane and a base body;
    a cavity arranged between the flexible measurement membrane and a base body and enclosed with a reference pressure, a deflection of the measurement membrane being dependent on a media pressure present on a media side at the measurement membrane, and being dependent on the reference pressure;
    at least one first capacitor having a plurality of electrodes and being arranged in a central region of one of (i) the measurement membrane and (ii) the base body with a variable electrode spacing depending on the deflection to capture a deflection of the measurement membrane;
    at least one second capacitor having a plurality of electrodes and being arranged in an edge region of one of (i) the measurement membrane and (ii) the base body; and
    a control and calculation unit configured to capture the capacitance of at least the at least one first capacitor and configured to determine and output a measurement value for the media pressure depending on the captured capacitance; and
    wherein the control and calculation unit is further configured to determine a capacitance of a diagnostics capacitor, which is formed by one electrode of the at least one first capacitor and one electrode of the at least one second capacitor, the electrodes being arranged on the same surface, and configured to evaluate the capacitance to diagnose the pressure transducer.

12. A non-transitory computer program product encoded with a computer program executed by a computer which causes diagnosis of a pressure transducer, the computer program comprising:

program code for capturing, by at least one first capacitor, a deflection of the measurement membrane, said at least one first capacitor having a plurality of electrodes arranged in a central region of one of (i) the measurement membrane and (ii) the base body with a variable electrode spacing depending on the deflection; and program code for determining and evaluating a capacitance of a diagnostics capacitor, which is formed by one electrode of the at least one first capacitor and one electrode of at least one second capacitor, the electrodes being arranged on a same surface to diagnose the pressure transducer.

13. The non-transitory computer program product as claimed in claim 12, wherein the non-transitory computer program product is one of (i) a data medium and (ii) a storage medium.

* * * * *